United States Patent [19]
Ramachandran et al.

[11] Patent Number: 5,854,890
[45] Date of Patent: Dec. 29, 1998

[54] FIELDBUS FUNCTION BLOCK SHELL WITH USER SELECTABLE DATA OWNERSHIP

[75] Inventors: Ram Ramachandran; Sherwin Su; Mike Klopfer; Donald B. Goff, all of Austin, Tex.

[73] Assignee: National Instruments Corporation, Austin, Tex.

[21] Appl. No.: 730,909

[22] Filed: Oct. 18, 1996

Related U.S. Application Data

[60] Provisional application No. 60/028,478 Oct. 15, 1996.
[51] Int. Cl.$^6$ ..................................................... G06F 11/00
[52] U.S. Cl. ..................................... 395/187.01; 395/680
[58] Field of Search ........................... 395/186, 187.01, 395/188.01, 182.02, 834, 837, 848, 200.55, 200.59, 680, 490, 681, 682

[56] References Cited

U.S. PATENT DOCUMENTS

| | | | |
|---|---|---|---|
| 4,875,174 | 10/1989 | Olodort et al. | 364/519 |
| 4,945,468 | 7/1990 | Carson et al. | 364/200 |
| 5,432,924 | 7/1995 | D'Souza et al. | 395/500 |
| 5,442,639 | 8/1995 | Crowder et al. | 371/30.1 |
| 5,535,416 | 7/1996 | Feeney et al. | 395/834 |
| 5,649,118 | 7/1997 | Carlisle et al. | 395/241 |
| 5,671,442 | 9/1997 | Feeney et al. | 395/834 |

OTHER PUBLICATIONS

Santori et al., "Fieldbus Brings Protocol to Process Control", IEEE Spectrum, vol. 33, Issue 3, pp. 60–64, Mar. 1996.
Nuemann et al., "Necessary Extensions of Fieldbus Systems for Distributed Processing", Factory Communications, IEEE, pp. 247–254, 1995.
Fieldbus Foundation Fieldbus Specification System Architecture, By Fieldbus Foundation, Aug. 28, 1995, pp. 1–40, 1–119, 1–54, 1–55, 1–44, 1–116, 1–66, 1–11, 1–52, & 1–22. Information in paragraph 5 of IDS.

*Primary Examiner*—Joseph Palys
*Attorney, Agent, or Firm*—Conley, Rose & Tayon; Jeffrey C. Hood

[57] ABSTRACT

A method for accessing data on a fieldbus device in a fieldbus network which comprises user selectable models of data ownership. The fieldbus device includes a user application executing on the fieldbus device and a function block shell executing on the fieldbus device. The method comprises receiving a request to access data on a fieldbus device. In response to the request, the function block shell determines the ownership attribute of the data, wherein possible ownership attributes include user owned or shell owned. The shell accesses the data in response to determining that the ownership attribute of the data is shell owned. The user application accesses the data in response to determining that the ownership attribute of the data is user owned. The method further includes shell notify and user pointer ownership models which provide additional flexibility.

28 Claims, 8 Drawing Sheets

FIELDBUS FUNCTION BLOCK SHELL WITH USER SELECTABLE DATA OWNERSHIP

CONTINUATION DATA

This application claims benefit of priority of provisional application Serial No. 60/028,478 filed Oct. 15, 1996, titled "Fieldbus function block shell" whose inventors are Sherwin Su, Ram Ramachandran, and Radha Ramnath.

FIELD OF INVENTION

The invention relates to fieldbus devices. In particular, the invention relates to a fieldbus function block shell which provides a user selectable ownership model for respective pieces of data for increased flexibility and efficiency.

BACKGROUND OF THE INVENTION

A fieldbus is a specific type of local area network (LAN) that is used to monitor or control one or more pieces of production equipment. A fieldbus network comprises a plurality of digital devices and control/monitoring equipment that are integrated to provide I/O and control for automated processes. A fieldbus network is typically used in industrial and/or process control applications, such as a factory or manufacturing plant. The physical devices in a fieldbus system are connected by the fieldbus. One example of a fieldbus network is the Fieldbus Foundation fieldbus network.

Fieldbus networks may contain one of four types of devices, these being temporary devices, field devices, interface devices, and monitor devices. Temporary devices are devices attached to one of four network addresses reserved for temporary or visitor use. Temporary devices are typically used for configuration and troubleshooting. Field devices are devices that typically comprise function block application processes or, in other words, devices that perform the I/O and control that automates the plant or factory. All field devices are given a permanent address by the system manager when they are attached to the network. Interface devices perform data display and other interface functions for field devices. Like field devices, interface devices are assigned a permanent address, but interface devices do not necessarily contain function block application processes. Finally, monitor devices are devices that are able to listen to network traffic but are not permitted to transmit onto the network. Monitor devices receive no address when attached to the network, and the other network devices are unaware of the monitor's presence.

As mentioned above, a field device generally comprises one or more function block application processes, referred to as function blocks. A function block comprises an algorithm and one or more parameters associated with the algorithm. Function blocks model field device functions, such as analog input (AI) functions and PID (Proportional Integral Derivative) control loop functions, among others. The function block model provides a common structure for defining function block inputs, outputs, algorithms and control parameters. This structure simplifies the identification and standardization of characteristics that are common to function blocks.

The function block model includes associated standardized definitions used to support function blocks. These definitions include the Object Dictionary (OD) and the Device Description Language (DDL). These definitions support application processes in the definitions and description of their network visible objects, such as function blocks and their parameters.

Each physical device performs a portion of the total system operation by implementing one or more application processes. Application processes perform one or more time-critical functions, such as providing sensor readings or implementing one or more control algorithms. As noted above, these field device functions are modeled by function blocks. The operation of the various function blocks is coordinated through configuration of their external communications, execution schedules, and operating parameters.

Physical devices in a fieldbus system are interconnected by a fieldbus network. Fieldbus networks may be comprised of one or more link segments interconnected by bridges. Communication between physical devices is provided by physical layer and data link layer protocols. Intervening bridges forward messages transparently between links.

A fieldbus network utilizes a four layered communication stack or four layer protocol, including a physical layer, a data link layer, and application layer that is divided into an access sublayer and a messaging sublayer. Transfer of information between field devices is provided by the physical layer and data link layer protocols. The physical layer specifies how signals are sent, the fieldbus data link layer (FDL) specifies how the network access is shared and scheduled among devices, and the application layer defines the message formats available to applications for the exchange of commands. Communications between application processes in the field devices occurs through the application layer protocols. The application layer is divided into two sublayers, an upper sublayer, defined by the Fieldbus Messaging Specification (FMS), that provides services to application processes, and a lower sublayer, known as the Fieldbus Access Sublayer (FAS), that maps FMS services onto the underlying capabilities of the data link layer.

System management is used in fieldbus networks to coordinate the operation of the various devices in a distributed fieldbus system. System management functions include node address assignment for devices, application clock synchronization, distributed application scheduling across the segment, and support for locating application tags. System management provides the facilities to bring new devices on the segment to an operational state and to control the overall system operation. System management uses FMS to remotely access management information within a device and to directly access the data link layer to carry out its other functions. A single system management entity exists in each device for each datalink segment connected to the device. The entity comprises user applications and a system management kernel. The kernel provides a network coordinated and synchronized set of functions.

In fieldbus networks, information is transmitted along the fieldbus in discrete segments commonly referred to as packets. Packets are passed between the field devices connected to the network. Each packet may contain FDL information, FAS information, and FMS information corresponding to the various architectural layers used in the fieldbus implementation.

Fieldbus devices generally include a fieldbus application or function block. It is also generally desirable to provide a fieldbus function block shell or interface which enables the function block to interface to the fieldbus network while hiding the complexity of network accesses. In a fieldbus system, it would generally be desirable to provide flexibility in the manner in which data is owned by the function block application (user application) and the function block shell or interface. Such flexibility would allow the programmer to optimize code and data accesses for particular applications.

SUMMARY OF THE INVENTION

The present invention comprises a fieldbus function block shell system and method for development and operation of a fieldbus device. The function block shell comprises an interface between a function block shell application, also referred to as a user application, and a fieldbus communication protocol stack. The function block shell provides an easy-to-use interface that allows device developers to develop Function Block Applications, and requires minimal knowledge of the Fieldbus Communication protocol. The function block shell is also used by function block applications during execution With the function block shell, the user can develop function block applications on the host, referred to as non-embedded applications. The user can also develop embedded function block applications that execute on a fieldbus device, such as a Fieldbus round card. The function block shell greatly eases the development of Function Block Applications (FBAP).

According to the present invention, the function block shell provides user selectable ownership of data, as well as the use of callback functions and an improved registration process. The function block shell constructs and owns the Object Dictionary for a Fieldbus system. However, the function block shell provides several options for data ownership. Each resource block, function block, and transducer block parameter has an ownership attribute. The ownership attribute is required by the function block shell. The ownership attribute is not network visible, and thus does not affect interoperability. The function block shell receives the type of ownership (the value of the ownership attribute) for every block parameter during registration. The type of ownership determines whether the function block shell or the user has direct access to data. The owner can access the data as if the data were any other variable in the program. The nonowner can access the data by function call (user to Shell) or by callback (Shell to user).

The function block shell provides two types of ownership, these being user-owned parameters and shell-owned parameters.

User-Owned Parameters operate as follows. In an embedded application, if the user owns a parameter, the function block shell may or may not have direct access (by pointer) to a user-owned parameter, depending on the user's choice. In non-embedded applications, the function block shell cannot have direct access to a user-owned parameter.

User-Owned Parameters include a user alone (USER_ALONE) ownership and a user pointer (USER_PTR) ownership. In USER_ALONE ownership, the user owns the parameter data. The function block shell does not have direct access (via pointer) to the data. Whenever the function block shell needs access to the parameter to respond to a remote FMS Read or FMS Write request, the function block shell executes one of the two callback functions the user registered previously. To read a value, the function block shell executes a read callback function referred to as CB_READ. To write a value, the function block shell executes a write callback function referred to as CB_WRITE.

In USER_PTR ownership, the user owns the data. The user informs the function block shell of the pointer to the parameter in the function block registration process. The function block shell has direct access to the data. In this scheme, semaphores are created to ensure mutual exclusion for accessing parameter data. One semaphore is created for each block, including the resource block, function block and transducer block. In the user's application program, before the user can access a parameter with USER_PTR ownership, the user invokes a function to acquire a semaphore of the block to which the parameter belongs. After the user accesses the parameter, the user invokes a function to release the semaphore. USER_PTR ownership is not allowed in a non-embedded application.

On a remote read or write request of parameters with this type of ownership, the function block shell asks the user application's permission to read or write the data. The function block shell asks permission by executing user-registered callback functions referred to as CB_NOTIFY_READ or CB_NOTIFY_WRITE.

With regard to Shell-Owned Parameters, if the Shell owns a parameter, the user does not have direct access (by pointer) to the parameter. The user must make a local function call to read or write the parameter. There are four variations of this type of parameter ownership:

In SHELL_ALONE ownership, the function block shell owns the data, and the function block shell responds to remote read and write requests to parameters with this attribute without user application involvement. In this case, no application-specific validation can be performed before honoring the remote read or write request. If the parameter being accessed remotely is a function block parameter, and the function block is currently executing, the function block shell generates a negative response. In all other cases, the function block shell gives a positive response and performs the read or write operation.

In SHELL_NOTIFY ownership, the function block shell owns the data, but it seeks the user's permission on remote requests to read or write the parameter. This is done by executing the CB_NOTIFY_READ or the CB_NOTIFY_WRITE callback function.

Callback functions are the means by which the function block shell can request service from the user's application. The user can specify a set of callback functions for a given Virtual Field Device (VFD) during VFD registration.

If a certain callback is not needed, the user application must specify the value NULL. For example, if a VFD has no USER_ALONE parameters, the read and write callback functions described below are not needed, and the user can register the callback functions as the NULL value. However, if the VFD has USER_ALONE parameters, then the user must provide proper read and write callback functions to handle the access of the parameters. A NULL callback function or a callback function that does not handle data access properly will probably crash the program.

The function block shell invokes one of these callback functions depending on the type of service it needs from the user application. The user can call the function block shell from within the callback functions.

The user selectable models of data ownership according to the present invention greatly increase the flexibility and enable the program developer to create more efficient applications.

BRIEF DESCRIPTION OF DRAWINGS

A better understanding of the present invention can be obtained when the following detailed description of the preferred embodiment is considered in conjunction with the following drawings, in which.

Figure 1:
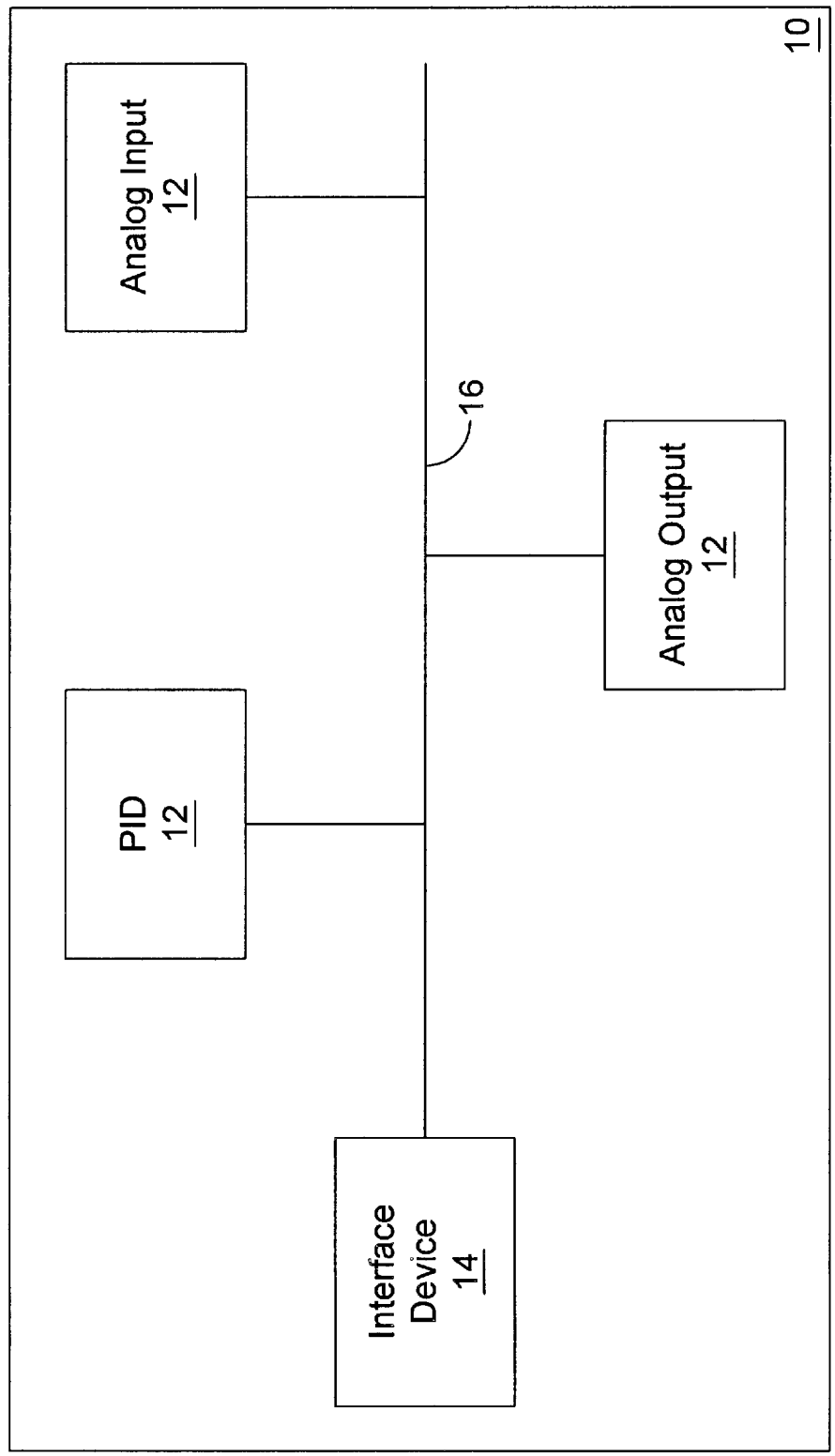
FIG. 1 is a simplified block diagram of a fieldbus network.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE DRAWINGS

Incorporation By Reference

The Fieldbus Specification, Document FF-94-801, available from the Fieldbus Foundation, is hereby incorporated by reference as though fully and completely set forth herein.

Provisional patent application Serial No. 60/028,478 filed Oct. 15, 1996, titled "Fieldbus function block shell" whose inventors are Sherwin Su, Ram Ramachandran, and Radha Ramnath is hereby incorporated by reference as though fully and completely set forth herein.

FIG. 1—Fieldbus Network

FIG. 1 is a block diagram of a simple single link fieldbus network 10. The fieldbus network 10 comprises a process control network system. In the present application, the term "Fieldbus" is intended to include any of various types of process control networks, including the Foundation Fieldbus fieldbus network, among others.

System 10 is comprised of a fieldbus 16 and a plurality of fieldbus devices 12 connected to fieldbus 16. Fieldbus devices 12 and fieldbus 16 are preferably compliant with the Fieldbus Specification published by the Fieldbus Foundation. However, as noted above, fieldbus devices 12 and fieldbus 16 may be compliant with other types of fieldbus networks or fieldbus specifications, as desired.

Fieldbus devices 12 each include one or more function blocks which perform functions or operations in the system. Fieldbus devices 12 also preferably each include a function block shell. More particularly, fieldbus devices 12 include a memory element or memory media which stores one or more function blocks and a function block shell or interface. Fieldbus devices 12 are capable of generating fieldbus packets on fieldbus 16. Each fieldbus device 12 is assigned a permanent network address. The fieldbus devices 12 illustrated in FIG. 1 include PID, Analog Input, and Analog Output devices. System 10 also includes an interface device 14, such as a computer system. The host computer system 14 may store a non-embedded application.

One or more of the fieldbus devices 12 preferably comprise Fieldbus "round cards". A fieldbus round card comprises a logic device, preferably configured as a round PCB card, which includes processing logic. Each fieldbus device round card includes one or more function blocks (user applications) stored on the round card in a memory, and a function block shell according to the present invention stored in a memory.

FIG. 2—Fieldbus Function Block Shell

Figure 2A:
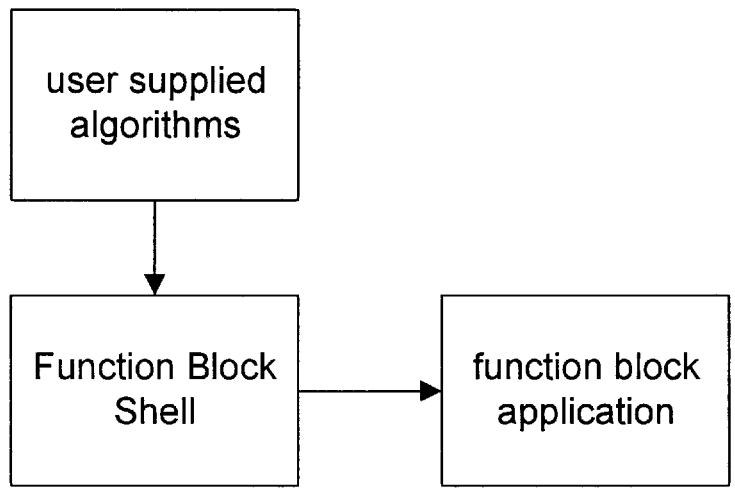
FIG. 2A illustrates how a user develops a function block shell application using the function block shell.

FIG. 2 displays the relationship of the user application, the fieldbus function block shell, and the various fieldbus devices. As shown in FIG. 2A, a user uses the function block shell to create or develop function block applications. As shown, the user supplies algorithms, such as function block algorithms. The user may also supply a template file comprising configuration or parameter information, as well as utilities or other code. The function block shell is a development tool which is used to create a user application in response to the user supplied code and/or algorithms.

The function block shell provides an easy-to-use interface that allows device developers to develop function block applications. The function block shell of the present invention requires minimal knowledge of the fieldbus communication protocol. The function block shell of the present invention can be used to develop function block applications on the host computer system, referred to as non-embedded applications. The function block shell of the present invention can also be used to develop embedded function block applications that execute on a Fieldbus round card.

Figure 2B:
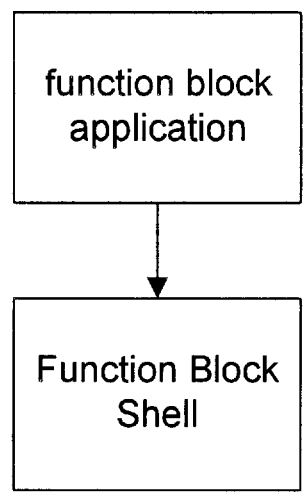
FIG. 2B illustrates the function block application using functions in the function block shell during execution.

The function block shell also includes functions that are invoked during execution of the function block applications. Thus, as shown in FIG. 2B, after creation the function block applications essentially execute on top of the function block shell. The function block application, also referred to as the user application, performs the function block specific algorithm. The function block shell handles the various network details.

The present invention comprises an improved fieldbus function block shell system and method. The function block shell comprises an interface between a function block shell and a Fieldbus Foundation Communication Protocol Stack. The function block shell provides an easy-to-use interface that allows device developers to develop Function Block Applications, and requires minimal knowledge of the Fieldbus Communication protocol. The function block shell is also used by function block applications during execution With the function block shell, the user can develop function block applications on the host, referred to as non-embedded applications. The user can also develop embedded function block applications that execute on the Fieldbus Round Card. The function block shell greatly eases the development of Function Block Applications (FBAP).

Fieldbus Function Block Shell—Features

The function block shell constructs and maintains the Object Dictionary (OD). Therefore, the user is not required to construct or maintain the OD. The OD is constructed by the function block shell during registration, a process in which the user informs the function block shell about all the VFDs, Blocks, and parameters in the application. The function block shell automatically responds to GetOD requests from the Fieldbus without user intervention.

The function block shell maintains the linkage objects as defined in the Function Block Application Process, Parts 1 & 2, of the Fieldbus Specification. The function block shell also establishes all types of connections, including trend and event connections (also known as QUU connections) and publisher/subscriber connections. The function block shell automatically responds to connection requests from a remote device.

The function block shell handles the communication aspects of the alert-processing state machine. At user request, the function block shell sends an alert notification message and waits for an alert confirmation. If the confirmation is not received within the timeout period, the function block shell repeats the notification a number of times. If a confirmation is received, the function block shell waits for an acknowledgment (which is separate from the confirmation) and alerts the user application when the acknowledgment arrives.

The function block shell maintains and reports trends. The user informs the function block shell about the number of trends, the parameter to trend on, and how often to sample. The function block shell creates the trend objects and samples the trend. The function block shell reports the trend when the trend buffer is full, or when a host device requests it. The fact that trend objects exist can be entirely transparent once the initial registration process is complete. However, the user can configure the trend objects locally through function calls.

The function block shell is capable of handling FMS Read/Write requests without involving the user. However, the user has the option to be involved in read/write requests if necessary. Further, the function block shell "snaps" (reads from the communications stack) input parameters before function block execution, and snaps output parameters at the end of block execution. The user is not required to make calls to the communications stack to perform these functions. The function block shell is also not dependent on the type of Function Block; it will accommodate new blocks or parameters without change.

Function Block Shell—Ownership of Data

According to the present invention, the function block shell provides user selectable ownership of data, as well as the use of callback functions and an improved registration process. The function block shell constructs and owns the Object Dictionary. However, the function block shell provides several options for data ownership. Each resource block, function block, and transducer block parameter has an ownership attribute. The ownership attribute is required by the function block shell. The ownership attribute is not network visible, and thus it does not affect interoperability. The function block shell receives the type of ownership (the value of the ownership attribute) for every block parameter during registration. The type of ownership determines whether the function block shell or the user has direct access to data. The owner can access the data as if the data were any other variable in the program. The non-owner can access the data by function call (user to Shell) or by callback (Shell to user).

The function block shell provides two types of ownership, these being user-owned parameters and shell-owned parameters.

User-Owned Parameters operate as follows. In an embedded application, if the user owns a parameter, the function block shell may or may not have direct access (by pointer) to a user-owned parameter, depending on the user's choice. In non-embedded applications, the function block shell cannot have direct access to a user-owned parameter.

User-Owned Parameters include a user alone (USER_ALONE) ownership and a user pointer (USER_PTR) ownership. In USER_ALONE ownership, the user owns the parameter data. The function block shell does not have direct access (via pointer) to the data. Whenever the function block shell needs access to the parameter to respond to a remote FMS Read or FMS Write request, the function block shell executes one of the two callback functions the user registered previously. To read a value, the function block shell executes the callback function of type CB_READ. To write a value, the function block shell executes the callback function of type CB_WRITE.

In USER_PTR ownership, the user owns the data. The user informs the function block shell of the pointer to the parameter in the function block registration process. The function block shell has direct access to the data. In this scheme, semaphores are created to ensure mutual exclusion for accessing parameter data. One semaphore is created for each function block. This includes the resource block and the transducer block. In the user application program, before the user application can access a parameter with USER_PTR ownership, the user application uses shWaitBlockSem to acquire the semaphore of the block to which the parameter belongs. After the user application accesses the parameter, the user application uses shSignalBlockSem to release the semaphore. USER_PTR ownership is not allowed in a non-embedded application.

On a remote read or write request of parameters with this type of ownership, the function block shell asks the user application's permission to read or write the data. The function block shell asks permission by executing user-registered callback functions of type CB_NOTIFY_READ or CB_NOTIFY_WRITE.

With regard to Shell-Owned Parameters, if the Shell owns a parameter, the user does not have direct access (by pointer) to the parameter. The user must make a local shReadParam or a shWriteParam function call to read or write the parameter. There are four variations of this type of parameter ownership:

In SHELL_ALONE ownership, the function block shell owns the data, and the function block shell responds to remote read and write requests to parameters with this attribute without user involvement. In this case, no application-specific validation can be performed before honoring the remote read or write request. If the parameter being accessed remotely is a function block parameter, and the function block is currently executing, the function block shell generates a negative FMS response. In all other cases, the function block shell gives a positive response and performs the read or write operation.

In SHELL_NOTIFY ownership, the function block shell owns the data, but it seeks the user application's permission on remote requests to read or write the parameter. This is done by executing the CB_NOTIFY_READ or the CB_NOTIFY_WRITE callback function.

Callback functions are the means by which the function block shell can request service from the user's application. The user can specify a set of callback functions for a given Virtual Field Device (VFD) during VFD registration.

If a certain callback is not needed, the user application must specify the value NULL. For example, if a VFD has no USER_ALONE parameters, the read and write callback functions described below are not needed, and the user can register the callback functions as the NULL value. However, if the VFD has USER_ALONE parameters, then the user must provide proper read and write callback functions to handle the access of the parameters. A NULL callback function or a callback function that does not handle data access properly will probably crash the program.

The function block shell invokes one of these callback functions depending on the type of service it needs from the user application. The user can call the function block shell from within the callback functions.

Callbacks for Parameter Access

The user can register four callback functions to control remote FMS Read/Write access to function block, transducer block, or resource block parameters. All the callback functions have the following parameters: the handle of the block to which the accessed parameter belongs, the offset of the accessed parameter within the block, and the subindex of the parameter. The subindex is only meaningful if the parameter is a record or an array; the subindex can be ignored if the parameter is a simple variable. In addition, each callback function has other function-specific parameters, and defines a set of return values expected by the function block shell.

CB_READ

This callback function is called when the function block shell receives a remote FMS Read request for parameters the user application owns, for example, ownership type USER. Depending on the return value of the callback function, the function block shell responds positively or negatively to the read request. The user application can construct the FMS user data packet, or give the function block shell a pointer to the data so it can form the FMS user data portion of the packet.

CB_WRITE

This callback function is called when the function block shell receives a remote FMS Write request for parameters that the user application owns, for example, ownership type USER. Depending on the return value of the callback function, the function block shell responds positively or negatively to the write request. The user application can decode the FMS user data and modify the parameter, or give the function block shell a pointer to the data so it can decode the FMS user data and modify the parameter.

CB_NOTIFY_WRITE

This callback function is called when the function block shell receives a remote FMS Write request for parameters with ownership type SHELL_NOTIFY or USER_PTR. Depending on the return value of the callback function, the function block shell responds positively or negatively to the write request. The parameter value is updated only on a positive response.

CB_NOTIFY_READ

This callback function is called when the function block shell receives a remote FMS Read request for parameters with ownership type SHELL_NOTIFY or USER PTR. Depending on the return value of the callback function, the function block shell responds positively or negatively to the read request.

Callbacks for Function Block Execution

A callback function must be registered within each VFD for executing function blocks. The System Management schedule determines when a function block in the VFD has to be executed, at which time the function block shell invokes this callback function. The function block shell gives the handle or descriptor of the block to be executed to the callback function. Before invoking the callback function, the function block shell will snap all the input, or subscribed parameters of the function block. To the function block shell, a return from the callback function means the end of execution of the function block. While the function block is executing, the function block shell responds negatively to all remote FMS Read/Write requests to the function block parameters. After the end of execution of the Function Block, the function block shell will snap the output, or published parameters, and update the relevant trend objects. The user application must determine if an alarm parameter exceeds its configured limit, and invoke the shAlertNotify function if an alert has to be sent.

Callbacks for Alert Notification

Two callback functions can be registered to handle alert notifications. One callback function notifies the user application of a successful notification and the receipt of a confirmation, or unsuccessful notifications. A second callback function informs the user application of the receipt of an acknowledgment from the remote machine.

Registration

Registration is the process by which a function block application informs the function block shell of the characteristics of the application. For each VFD, the following must be given to the function block shell: user-defined data types, the resource blocks, transducer blocks, function blocks, the parameters in the blocks, and callback functions. In addition, some other general configuration information must be specified. Registration must take place before the user can interact with the function block shell or the Fieldbus.

The registration process is different for embedded and non-embedded applications. In both methods, the first step is to construct an ASCII file of a defined format, called the device template, to describe the application. In a non-embedded application, the device template is registered with the callback functions using the shRegisTemplate function.

For embedded applications, a device code-generator utility is used to convert the device template to a C file. This C file must be compiled and linked with other modules of the application. The format of the template, the registration functions, and the automatic code generator utility are described below.

Registration Functions

The following describes the methods of registration and the associated functions.

| | |
|---|---|
| shRegisTemplate | Register using a template file for a non-embedded application |
| shGetRegisErrStr | Get the error string generated in function shRegisTemplate for a non-embedded application |
| shRegisCallback | Register callback functions for an embedded application |
| shRegisParamPtr | Register pointers of parameters with USER_PTR ownership for an embedded application |

Device Template Format

The format of the device template is as follows. A sample template file is also included below

File Format

The template file contains several sections, each with a keyword followed by several lines of description. The sections should be in the following order:

VFD
USER_TYPE
BLOCKS
TRENDS
VARLISTS

As in the "C++" language, the double slash ("//") is used for comments.

VFD

The keyword "VFD" is preferably followed by thirteen lines. They are as follows:

vendor name
model name
revision
profile number 1, profile number 2
number of user defined types
number of transducer blocks
number of function blocks
number of maximum linkage objects
number of maximum alert objects
number of maximum trend float objects
number of maximum trend discrete objects
number of maximum trend bitstring objects
number of maximum variable lists

User Types

The keyword USER_TYPE should not be used if the number of user-defined types is zero. Otherwise, descriptions of user-defined type should be provided after the keyword USER_TYPE, and the number of descriptions should match the number of user-defined types specified in the VFD section.

Each user type description has the following format:

number of entries (i.e., n)
typeindex, size, offset
... (total of n lines)
typeindex, size, offset For each entry (subfield) of the user-defined type, the index of its type, typeindex, must be provided. The size should also be provided for the string type (octet string, visible string and bit string). For types for which the size is well known, provide a size of 0.

The offset of an entry in a data type is the offset of that entry in the C structure of the data type. The function block shell has to know the addresses of the structure members based on the address of the structure itself in order to process the read and write callback functions. Therefore, the offsets of members must be given to the function block shell.

Blocks

The number of blocks (resource blocks, transducer blocks, and function blocks) should match the number specified in the "VFD" section, and the block descriptions should be in this order: first PHYSICAL, then TRANSDUCER and then FUNCTION blocks.

Each block description starts with the keyword "BLOCK," followed by descriptions of the block and each parameter of the block.

The description of the block consists of five lines:

block tag
block type (PHYSICAL, TRANSDUCER or FUNCTION)
DD name, DD item, DD revision
profile and profile revision, execution time, number of view3, number of view4
number of parameters.

Each parameter must have one line of description. For the standard parameters defined in the Fieldbus Specification, the format of the description is as follows:

DD name, DD item, standard parameter name, owner

For non-standard parameters, the data type and usage information should also be provided. For non-array parameters of some types, the initial value is required. The format of the non-standard parameter description is as follows:

DD name, DD item, data meta type, data type, usage, owner, initial value or:

DD name, DD item, data meta type, data type, (# of elements for the array, if an array), usage, owner Thus, for non-standard parameters, the block description include owner information according to the present invention.

Data Meta Type

There are three data meta types:
SIMPLE
RECORD
ARRAY

Data Type

Data types are types standardized in Fieldbus Specifications and user-defined types. The complete list of the standard types used in the template registration is in the following table:

TABLE 3-1

Data Type Names Used in Template Registration

| Index | Name | need initial value? |
|---|---|---|
| 1 | Boolean | Yes |
| 2 | Int8 | Yes |
| 3 | Int16 | Yes |
| 4 | Int32 | Yes |
| 5 | uint8 | Yes |
| 6 | uint16 | Yes |
| 7 | uint32 | Yes |
| 8 | Float | Yes |
| 9 | Visible Str | No |
| 10 | Octet Str | No |
| 11 | Date | No |
| 12 | Time Of Day | No |
| 13 | Time Diff | No |
| 14 | Bit String | No |
| 21 | Time Value | No |
| 32 | Block | No |
| 33 | VS Float | No |
| 34 | VS Discrete | No |
| 35 | VS BitString | No |
| 36 | Scaling Struct | No |
| 37 | Mode Struct | No |
| 38 | Access Perm | No |
| 39 | Alarm Float | No |
| 40 | Alarm Discrete | No |

TABLE 1-1

Data Type Names Used in Template Registration (Continued)

| Index | Name | need initial value? |
|---|---|---|
| 41 | Event Update | No |
| 42 | Alarm Summary | No |
| 43 | Alert Analog | No |
| 44 | Alert Discrete | No |
| 45 | Alert Update | No |
| 46 | Trend Float | No |

TABLE 1-1-continued

Data Type Names Used in Template Registration (Continued)

| Index | Name | need initial value? |
|---|---|---|
| 47 | Trend Discrete | No |
| 48 | Trend Bitstring | No |
| 49 | Linkage | No |
| 50 | Simulate Float | No |
| 51 | Simulate Discrete | No |
| 52 | Simulate BitString | No |
| 53 | Test | No |
| 54 | Action | No |

For user-defined types, the type name for the nth type the user application defines in the device template is:
USER_TYPEn
where all data type names are case-sensitive.

Usage

A parameter can be contained, input, or output:

| | |
|---|---|
| C | contained |
| IN | input |
| OUT | output |

Owner

The owner attribute tells the function block shell the ownership of the parameter. Ownership of Data is uses according to the present invention to provide improved flexibility and increased performance, as discussed further below. The owner attribute can take the following values.

| | |
|---|---|
| USER_ALONE | the user application owns the data |
| USER_PTR | the user application owns the data, and the function block shell keeps the pointer. This is for embedded applications only. |
| SHELL_ALONE | The function block shell owns the data. |
| SHELL_NOTIFY | The function block shell owns the data, and whenever the network asks to read or modify the data, the function block shell asks the user application's permission with a callback function |

Initial Value

Initial values should be provided for integer and float parameters. +INF and –INF are for positive and negative infinite values.

Trends

There are three types of trends: float, discrete and bit string. They all follow the same format in the template, and they should be present in the order of float, discrete, and bit string after the keyword "TRENDS".

The format of a float trend description is as follows:

number of float trends(i.e., n)

block number, parameter offset, sample type, sample interval

... (total of n lines)

block number, parameter offset, sample type, sample interval

If there is no trend float, the number of float trends should be zero.

The discrete trend and bit string trend have exactly same format as above.

Sample Type

There are two sample types: INSTANT and AVERAGE. The definition of these sample types can be found in the Fieldbus Foundation Specification, referenced above.

Variable Lists

Following the keyword VARLISTS is the number of variable lists to be defined. Each variable list is defined in the following format:

VARLIST variable list name number of variables(i.e., n)

block number, parameter offset

... (total of n lines)

block number, parameter offset

Registration in Non-Embedded Applications

In a non-embedded application, the shRegisTemplate is used to register function block applications. The inputs of this function are the file name of the device template and the callback functions. If shRegisTemplate fails, shGetRegisErrStr is used to get the error string.

shRegisTemplate Registration Functions

Purpose

Register function block application with the device template file.

Format

| | |
|---|---|
| bool_t | |
| shRegisTemplate( | |
| char | *fileName, |
| CB_READ | *cbRead, |
| CB_WRITE | *cbWrite, |
| CB_NOTIFY_READ | *cbNotifyRead, |
| CB_NOTIFY_WRITE | *cbNotifyWrite, |
| CB_EXEC | *cbExec, |
| CB_ACK_EVENTNOTIFY | *cbAckEventNotify, |
| CB_ALARM_ACK | *cbAlarmAck, |
| void | *reserveForFuture); |

Includes include "fbsh.h"

Parameters

| | |
|---|---|
| IN fileName | The name of the template file. |
| IN cbRead | Callback function for reading parameters. |
| IN cbWrite | Callback function for writing parameters. |
| IN cbNotifyRead | Callback function for notifying reading of parameters. |
| IN cbNotifyWrite | Callback function for notifying writing of parameters. |
| IN cbExec | Callback function for block execution. |
| IN cbAckEventNotify | Callback function for acknowledgment of event. |

-continued

| | |
|---|---|
| IN cbAlarmAck | Callback function for acknowledgment of alarm. |
| IN reserveForFuture | This field is reserved for future use. |

Return Values

| |
|---|
| TRUE on success, FALSE otherwise |
| shRegisTemplate    Registration Functions Continued |

Platform

For non-embedded applications only.

Description

In this function, the function block shell opens the template file, parses it, and constructs the Object Dictionary based on the information in the file. The template file file must follow the format specified in the File Format section, earlier in this chapter. If a certain callback function is not provided, the value NULL must be passed for that parameter.

If an error occurs in this function, the error message is written to the global error string, and FALSE is returned to the user application. The user application can use shGetRegisErrStr to get the error string.

shGetRegisErrStr Registration Functions

Purpose

Get the error string generated in shRegisTemplate.

Format char*
shGetRegisErrStr( );

Includes include "fbsh.h"

Return Values

Pointer to the error string.

Platform

For non-embedded applications only.

Description

When an error occurs in shRegisTemplate, this function is used to get the error message.

Possible Errors

If this function is called when there are no errors in shRegisTemplate, the content of the error message is undefined.

Registration in an Embedded Application

For embedded applications, the device code-generator utility converts the device template to a C file. This C file must be compiled and linked with the other modules of the application.

The device code-generator utility codegen.exe is an MS-DOS program. It is distributed as part of the National Instruments Fieldbus Device Interface Kit. It takes two command line arguments, as follows:

codegen input output where input is the file name of device template, and the output is the generated C file.

shRegisCallback Registration Functions

Purpose

Register callback functions of a VFD with the function block shell.

Format

| | |
|---|---|
| RETCODE shRegisCallback( | |
| HDL_VFD | hVfd, |
| CB_READ | *cbRead, |
| CB_WRITE | *cbWrite, |
| CB_NOTIFY_READ | *cbNotifyRead, |
| CB_NOTIFY_WRITE | *cbNotifyWrite, |
| CB_EXEC | *cbExec, |
| CB_ACK_EVENTNOTIFY | *cbAckEventNotify, |
| CB_ALARM ACK | *cbAlarmAck, |
| void | *reservedForFuture) |

Includes include "fbsh.h"

Parameters

| | |
|---|---|
| IN hVfd | VFD handler. |
| IN cbRead | Callback function for read. |
| IN cbWrite | Callback function for write. |
| IN cbNotifyRead | Callback function for read notify. |
| IN cbNotifyWrite | Callback function for write notify. |
| IN cbExec | Callback function for block execution. |
| IN cbAckEventNotify | Callback function for acknowledgments of event notify. |
| IN cbAlarmAck | Callback function for acknowledgment of alarm |
| IN reservedForFuture | Reserved for future use. |

Return Values retcode

Plafform

For embedded applications only.

Description shRegisCallback is used to register callback functions of a VFD to the function block shell. The user application must register the VFD before registering any of the VFD data types, blocks, or parameters. The user application must use the descriptor or handle returned by this function in all subsequent functions related to this VFD.

The pointer to the various callback routines detailed in Chapter 4, Callback Functions, are passed as input parameters. If a certain callback is not supported, the user application must pass the value NULL.

Possible Errors

| | |
|---|---|
| E_INVALID_VFD_HANDLE | Number of VFDs exceeds limit. |
| E_CB_RW_NULL | Read or write callback functions should not be NULL, because there are parameters with USER_ALONE ownership. |
| E_CB_R_NOTIFY_NULL | Read notify callback function should not be NULL, because there are parameters with SHELL_NOTIFY or USER_PTR ownership. |
| E_CB_W_NOTIFY_NULL | Write notify callback function should not be NULL, because there are parameters with SHELL_NOTIFY or USER_PTR ownership. | shRegisParamPtr Registration Functions

Purpose

Register pointers of parameters with USER_PTR ownership.

Format

```
RETCODE shRegisParamPtr(
    HDL_VFD        hVfd
    HDL_BLOCK      hBlock,
    uint16         numParam,
    PARAM_PTR      paramPtr[]);
```

Includes include "fbsh.h"

Parameters

| | | |
|---|---|---|
| IN | hvfd | Handle of the VFD to which these parameters belong. |
| IN | hBlock | Handle of the block to which these parameters belong. |
| IN | numParam | Number of parameters with USER_PTR ownership in this block. |
| IN | paramPtr | Offset and pointers of the parameters. This array should have the length numParam. |

Return Values retcode

Platform

For embedded applications only.

Description shRegisParamPtr is used to register the pointers of parameters with ownership USER_PTR on a per block basis, meaning that if there are n function blocks in the application, and each of them has parameters with USER_PTR ownership, then this function is used n times.

The memory location of parameters with USER PTR ownership should not change in the entire application. Otherwise, the function block shell might read and write to an illegal memory location and crash the application. The data of the parameters with USER_PTR ownership must be global variables or allocated memory that is never freed.

The dynamic registration of parameter pointers is not supported. This function can only be called before the shInitshell function is called. It cannot be called in any of the callback functions.

Possible Errors

| | |
|---|---|
| E_INVALID_VFD_HANDLE | The VFD handle is invalid. |
| E_INVALID_BLOCK_HANDLE | The block handle is invalid. |
| E_NUM_PARAM_MISMATCH | The number of parameters is not equal to the number of parameters with USER_PTR ownership in this block |
| E_INVALID_PARAM_OFFSET | There is an invalid parameter offset in paramPtr. |
| E_PARAM_TYPE_MISMATCH | There is a parameter with ownership that is not USER_PTR in paramPtr. |

Callback Functions

This chapter describes the callback functions of the function block shell.

Callback Functions

| | |
|---|---|
| CB_READ | Read USER_ALONE parameters when responding to a remote read request |
| CB_NOTIFY_READ | The function block shell obtains permission to read parameters with ownership type SHELL_NOTIFY or USER_PTR. |
| CB_WRITE | Write to USER_ALONE parameters when responding to a remote write request |
| CB_NOTIFY_WRITE | The function block shell obtains permission to write parameters with ownership type SHELL_NOTIFY or USER_PTR |
| CB_EXEC | Function Block execution callback function |

Alarm-Related Callback Functions
These alarm-related callback functions are described in Chapter 6, Alarm Functions.

| | |
|---|---|
| CB_ACK_EVENTNOTIFY | The function block shell notifies the user application of the confirmation status of an alert notification |
| CB_ALARM_ACK | The function block shell notifies the user application of an alarm acknowledgment |

CB_READ Callback Function

Purpose

The function block shell reads USER_ALONE parameters when responding to remote read requests

Definition

```
typedef RETCODE
(CB_READ(HDL_BLOCK    hBlock,
    uint16           offset,
    uint16           subindex,
    void*            buf,
    uint8*           bufLen,
    void**           paramPtr));
```

Parameters

| | |
|---|---|
| IN hBlock | Block handle. |
| IN offset | Offset of the parameter in the block. |
| IN subindex | Subindex within the parameter. |
| IN buf | Data buffer to be filled. |
| IN/OUT bufLen | Length of the data buffer. |
| OUT paramPtr | Pointer to the parameter data. |

Return Values retcode

Description

The function block shell calls this function to get USER_ALONE parameters. In this function, user application has three options:

- The user application encodes data in FMS format, store it in buf, set the bufLen, and then return R_SUCCESS. In this case, the function block shell assumes the buffer data points to contains the correct data.
- Instead of encoding the data, the user application passes a pointer to the parameter in paramPtr, and return R_DELEGATE. The function block shell then encodes the data to FMS format.
- E_NOT_PERMITTED should be returned if the reading is not permitted. In this case, the function block shell does not encode the data. Instead, the function block shell returns a negative response to the remote read request.

CB_NOTIFY_READ Callback Functions

Purpose

The function block shell obtains permission to read parameters with ownership type SHELL_NOTIFY or USER_PTR.

Definition

```
typedef RETCODE
   (CB_NOTIFY_READ(HDL_BLOCK    hBlock,
        uint16                  offset,
        uint16                  subindex));
```

Parameters

| | |
|---|---|
| IN hBlock | Block handle. |
| IN offset | Offset of the parameter in the block. |
| IN subindex | Subindex within the parameter. |

Return Values retcode

Description

When responding to a remote read request of a parameter with ownership type SHELL_NOTIFY or USER_PTR, the function block shell invokes this function to get the user application's permission to read the data. The user application should return R_SUCCESS if the request is allowed, and E_NOT_PERMITTED otherwise. In the latter case, the function block shell responds negatively to the remote read request.

CB_WRITE Callback Function

Purpose

The function block shell writes to USER_ALONE parameters.

Definition

```
typedef RETCODE
   (CB_WRITE(HDL_BLOCK    hBlock,
        uint16            offset,
        uint16            subindex,
        void*             buf,
        uint8*            bufLen,
        void**            paramPtr,
        uint16*           paramLen));
```

Parameters

| | |
|---|---|
| IN hBlock | Block handle. |
| IN offset | Offset of the parameter in the block. |
| IN subindex | Subindex within the parameter. |
| IN buf | Data in FMS format. |
| IN bufLen | Length of the data buffer. |
| OUT paramPtr | Pointer to the parameter data. |
| OUT paramLen | Length of the buffer paramPtr points to. |

Return Values retcode

Description

The function block shell calls this function to modify the parameter data owned by the user application. In this function, the user application has three options:

- The user application decodes data from FMS format, modify the parameter, and then return R_SUCCESS.
- Instead of decoding the data, the user application passes the pointer to the parameter in paramPtr and the length of the parameter in paramLen, and return R_DELEGATE. The function block shell then modifies the parameter.
- The user application should return E_NOT_PERMITTED if the writing is not permitted. In this case, the function block shell does not decode the data. Instead, the function block shell returns a negative response to the remote write request.

CB_NOTIFY_WRITE Callback Function

Purpose

The function block shell gets the permission to write parameters with ownership of types SHELL_NOTIFY or USER_PTR.

Definition

```
typedef RETCODE
   (CB_NOTIFY_WRITE(HDL_BLOCK    hBlock,
        uint16                   offset,
        uint16                   subindex));
```

Parameters

| | |
|---|---|
| IN hBlock | Block handle. |
| IN offset | Offset of the parameter in the block. |
| IN subindex | Subindex within the parameter. |

Return Values retcode

Description

When responding to a remote write request of a parameter with ownership type SHELL_NOTIFY or USER_PTR, the function block shell invokes this function to get the user application's permission to modify the data. The user application should return R_SUCCESS if the request is allowed, and E_NOT_PERMITTED otherwise. In the latter case, the function block shell responds negatively to the remote write request.

CB_EXEC Callback Functions

Purpose

The callback function for function block execution.

Definition

```
typedef void
(CB_EXEC(HDL_BLOCK          hBlock));
```

Parameters

| | |
|---|---|
| IN hBlock | Block handle. |

Description

This function is called when the function block shell receives an FB_EXEC indication from the stack. Before calling this function, the function block shell updates the status and value of all the input parameters. If there is no connection to an input parameter, the function block shell sets the quality of the status of this parameter to BAD, the sub-status to NOT CONNECTED, and the limit to NOT LIMITED. If no updated value is received from the network for an input parameter, then the quality of the status is set to BAD, the sub-status to either NO COMMUNICATION WITH LAST USABLE VALUE or NO COMMUNICATION WITH NO USABLE VALUE, and the limit is set to 0. Otherwise, the status is what is received from the network.

After calling this function, the function block shell sends the output parameter values for this block to the Fieldbus, and then updates the trends if there are any parameters in this block that need trends.

While this function is executing, remote read and write requests of the parameters of this function block are not permitted. Therefore, the integrity of the data throughout the function block execution period is guaranteed.

To the function block shell, the return of this function means that the function block has finished executing. Therefore, it is the user application's responsibility to ensure that this function returns within the maximum execution time specified for it in the function block registration.

The user application should examine the alarm conditions in this function. If an alarm occurs, the user application should call the shAlertNotify function, so the function block shell can report the alarm.

FIG. 3—Flowchart Diagram of Access (Read and Write) Operations

Referring now to FIGS. 3A—3E, a flowchart diagram illustrating operation of a network access operation according to the present invention is shown. The network access operation includes a read operation or write operation from a remote device on the network. Thus, in the present disclosure, the term "access" is intended to encompass both reads and writes. Here it is assumed that one or more blocks have registered with the function block shell as described above. As described above, at least a subset of the function blocks, resource blocks and transducer blocks have ownership attributes for parameters. The ownership attributes of each block may take values of User Alone, User Ptr, Shell Alone, and Shell Notify.

Figure 3A:
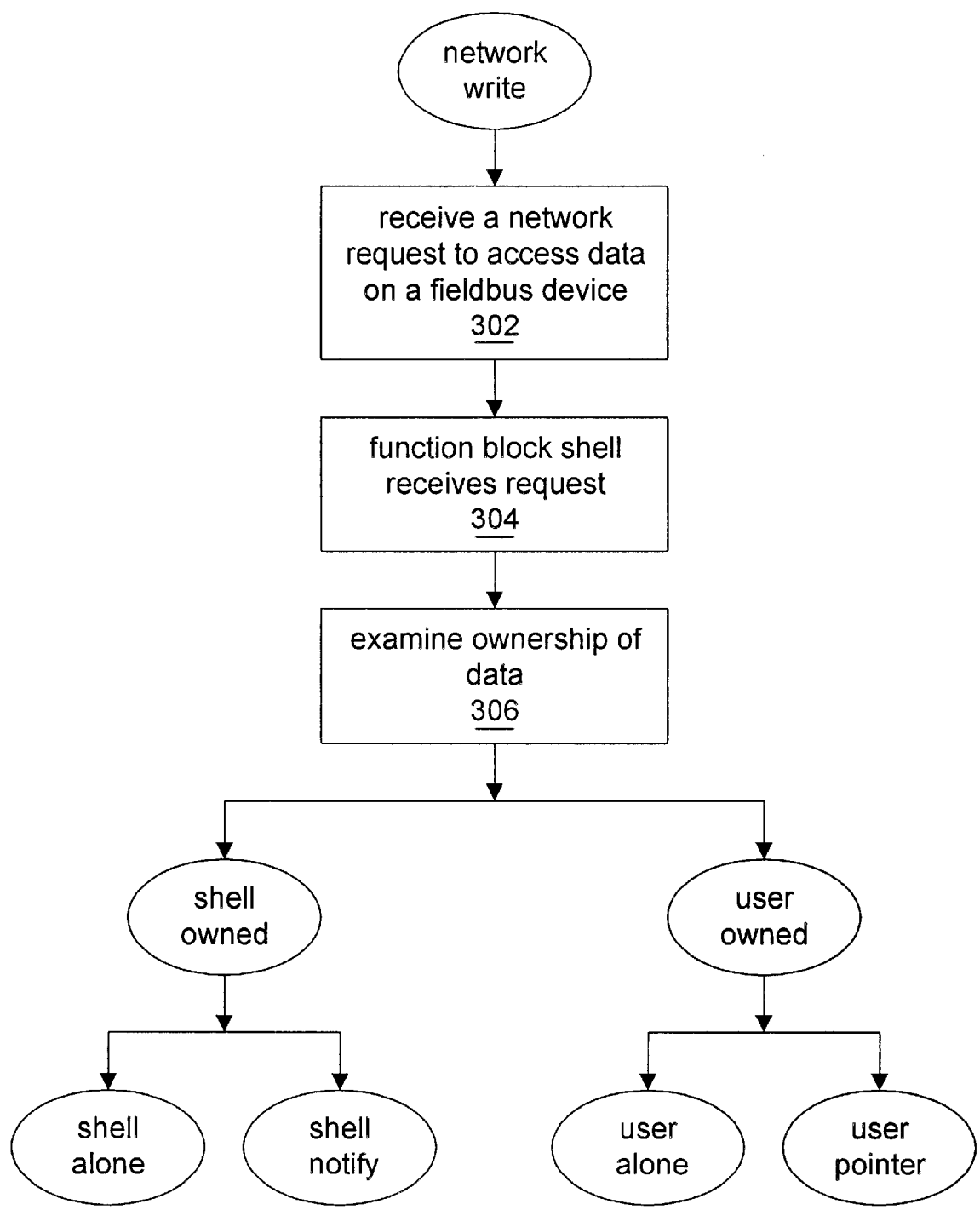
FIGS. 3A–3E is a flowchart diagram illustrating operation of the function block shell when a remote network access request is received.

FIG. 3A—Network Access

As shown in FIG. 3A, in step 302 the fieldbus device receives a network request to access data, i.e., read or write data, on a fieldbus device. In step 304 the function block shell receives the request. In step 306 the function block shell determines the ownership of data being written. As discussed above, this data will generally have previously been assigned an ownership attribute of either User Alone, User Ptr, Shell Alone, and Shell Notify. As shown in FIG. 3A, the data will either be shell owned or user owned. Within shell owned, the data will either be classified as Shell Alone or Shell Notify. Within user owned, the data will either be classified as User Alone or User Pointer. It is noted that other types of ownership models may be used, as desired.

Figure 3B:
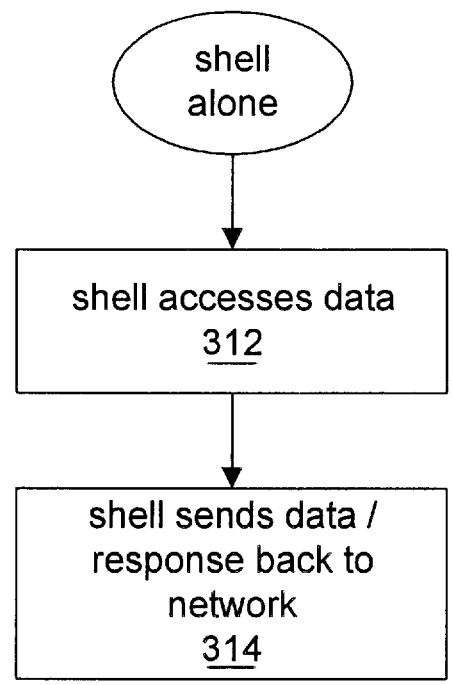

FIG. 3B—Shell Alone

Referring now to FIG. 3B, if the data is determined in step 306 to be "shell alone", then in step 312 the function block shell accesses the data and in step 314 the shell sends the data/response back to the network. In the case of a read, the shell reads the data and provides the read data back on the network, i.e., to the requesting device. In the case of a write, the shell modifies or writes the data and provides a response back on the network.

Thus, as noted above, in SHELL_ALONE ownership, the function block shell owns the data, and the function block shell responds to remote read and write requests to parameters with this attribute without user application involvement. In this case, no application-specific validation can be performed before honoring the remote read or write request. If the parameter being accessed remotely is a function block parameter, and the function block is currently executing, the function block shell generates a negative FMS response. In all other cases, the function block shell gives a positive response and performs the read or write operation.

Figure 3C:
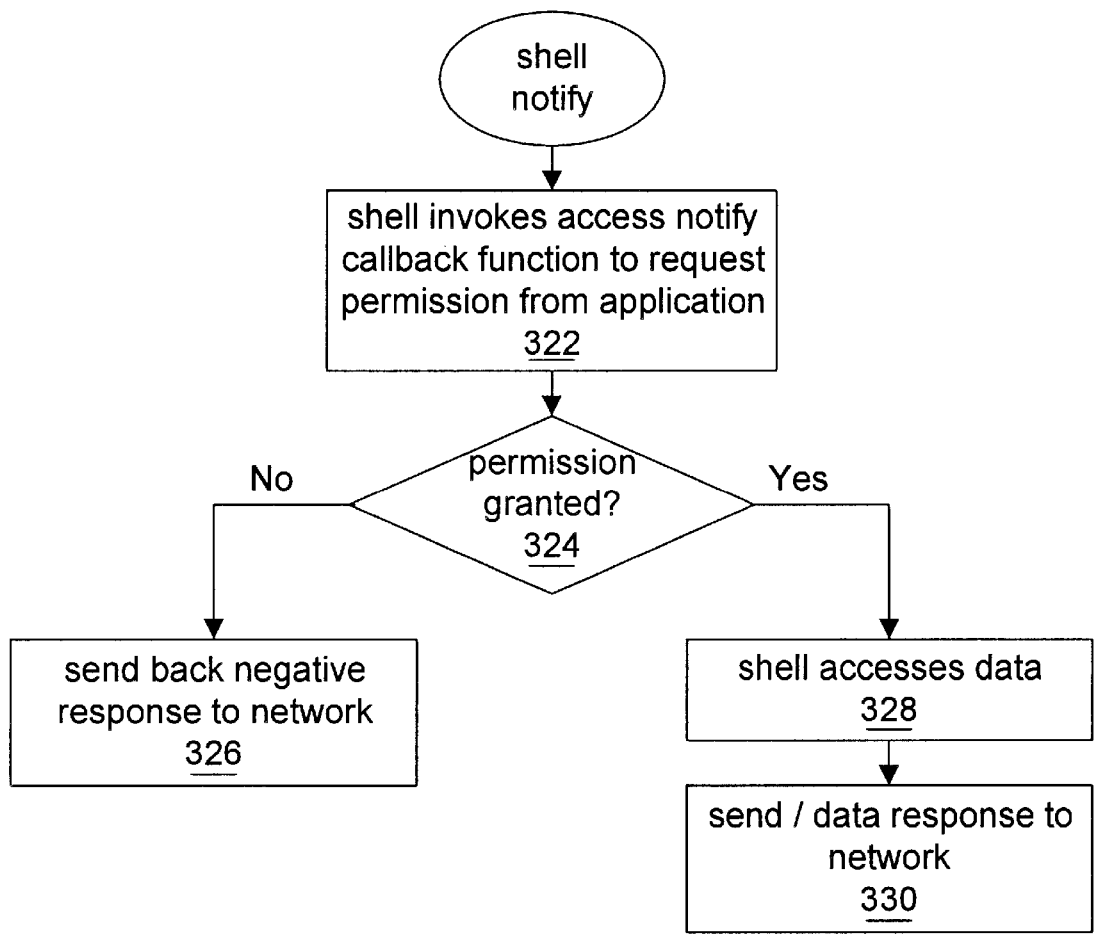

FIG. 3C—Shell Notify

Referring now to FIG. 3C, if the data is determined in step 306 to be "shell notify", then in step 322 the shell invokes an access notify callback function to obtain permission from the user application. In the case of a read, the shell executes or invokes the read notify callback function (CB_

NOTIFY_READ) to obtain permission from the user application to read the shell notify parameters. In the case of a write, the shell executes or invokes the write notify callback function (CB_NOTIFY_WRITE) to obtain permission from the user application to write to the shell notify parameters. The function block shell invokes the read or write notify callback function when responding to a remote write request of a parameter with ownership type SHELL_NOTIFY or USER_PTR. The function block shell invokes this function to obtain the user application's permission to read or modify the data.

In step 324 the function block shell determines if permission is granted. The user application returns a success value R_SUCCESS if the request is allowed, and an error code otherwise. If permission is not granted, then in step 326 the function block shell provides a negative response to the network. If permission is granted by the user application in response to the write notify callback function, then in step 328 the function block shell accesses the data and in step 330 the shell returns data/response back to the network. In the case of a read, the shell reads the data and provides the read data back on the network, i.e., to the requesting device. In the case of a write, the shell modifies or writes the data and provides a response back on the network.

Thus, as noted above, in SHELL_NOTIFY ownership, the function block shell owns the data, but it seeks the user's permission on remote requests to read or write the parameter. This is performed for reads by executing the CB_NOTIFY_READ callback function and is performed for writes by executing the CB_NOTIFY_WRITE callback function. As noted above, callback functions are the means by which the function block shell can request service from the user's application. The user can specify a set of callback functions for a given Virtual Field Device (VFD) during VFD registration.

FIG. 3D—User Alone

Figure 3D:
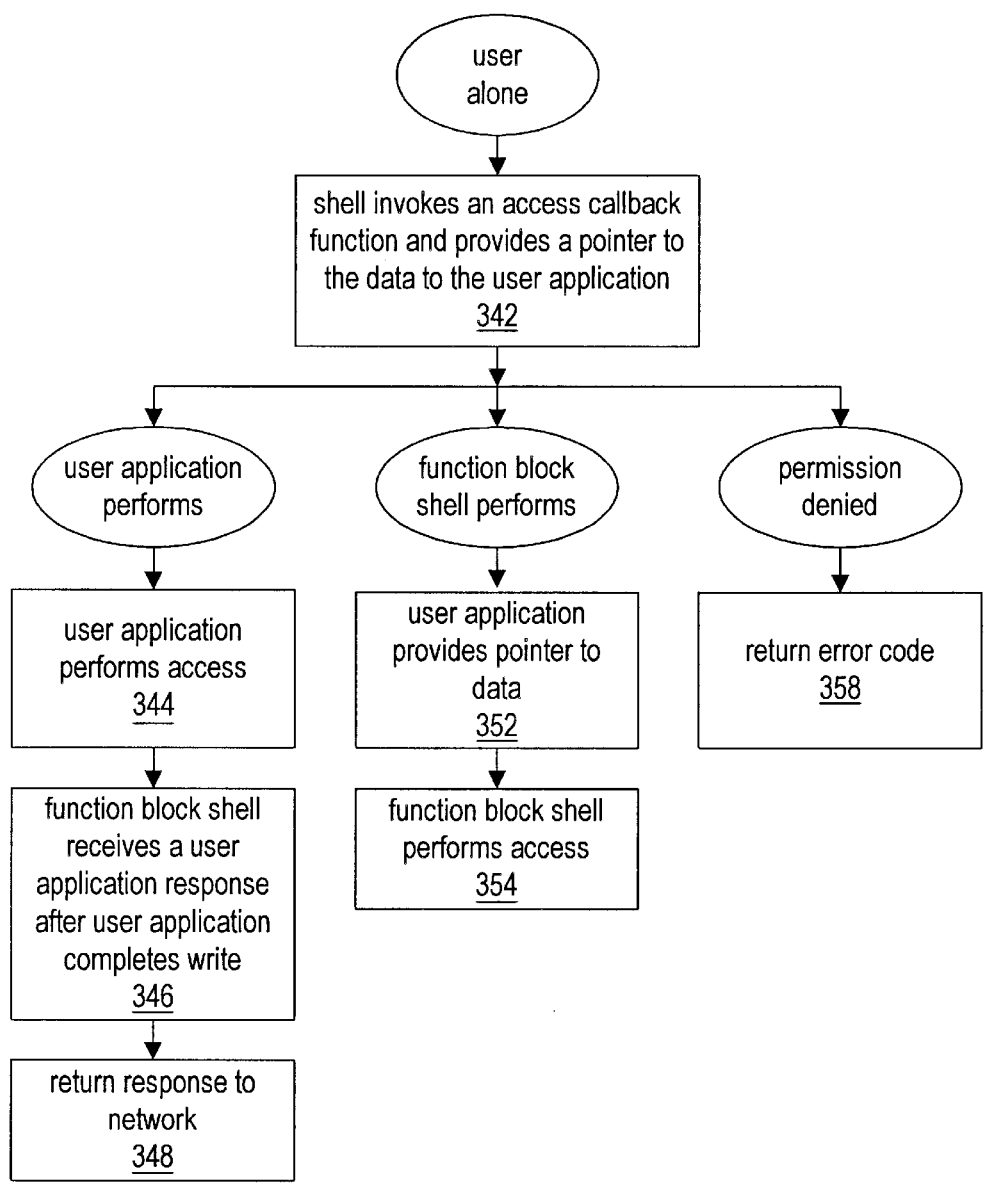

Referring now to FIG. 3D, if the data is determined in step 306 to be "user alone", then in step 342 the shell invokes an access callback function. In the case of a read, the shell invokes or executes the read callback function (CB_READ), and in the case of a write the shell invokes or executes the write callback function (CB_WRITE). The function block shell calls this function to access, i.e., read or modify, the parameter data owned by the user application. The function block shell also provides a pointer to the data.

Here the user application has the option of accessing the data, providing a pointer back to the function block shell to direct the function block shell to access the data, or denying permission.

As shown, where the user application decides to perform the access, in step 344 the user application performs the access. In step 346 the function block shell receives a response from the user application after the user application completes the access. In step 348 the shell returns a response to the network. Where the user application decides to direct the shell to perform the access, in step 352 the user application provides a pointer to the data to the function block shell. In step 354 the function block shell performs the access. Where the user application decides to deny permission, in step 358 the callback function returns an error code, and the shell in turn returns an error code to the requesting device.

In the case of a write, in the CB_WRITE function the user application has three options. One option is for the user application to decode data from FMS format, modify the parameter, and then return a success value. A second option is for the user application to direct the function block shell to perform the write. In this option, instead of decoding the data, the user application passes the pointer to the parameter in paramPtr and the length of the parameter in paramLen, and returns R_DELEGATE. The function block shell then modifies the parameter in response to this action. In the third option, the user application returns an error code if the writing is not permitted. In this case, the function block shell does not decode the data. Instead, the function block shell returns a negative response to the remote write request.

In the case of a read, in the CB_READ function the user application has three options. One option is for the user application to encode the data to FMS format, store the data in a buffer, set a buffer length (buflen) variable, and then return a success value. In this case, the function block shell assumes that the buffer pointed to by a variable referred to as "data" contains the correct data. A second option is for the user application to direct the function block shell to encode the data for the read. In this option, instead of encoding the data, the user application passes a pointer to the parameter in paramPtr and returns R_DELEGATE. The function block shell then encodes the data to FMS format. In the third option, the user application returns an error code if the reading is not permitted. In this case, the function block shell does not encode the data. Instead, the function block shell returns a negative response to the remote read request.

Thus, as noted above, in USER_ALONE ownership the user owns the parameter data. The function block shell does not have direct access (via pointer) to the data. Whenever the function block shell needs access to the parameter to respond to a remote FMS access request, the function block shell executes an access callback function the user registered previously. More specifically, whenever the function block shell needs access to the parameter to respond to a remote FMS Read or Write request, the function block shell executes the callback function CB_READ or CB_WRITE the user registered previously.

Figure 3E:
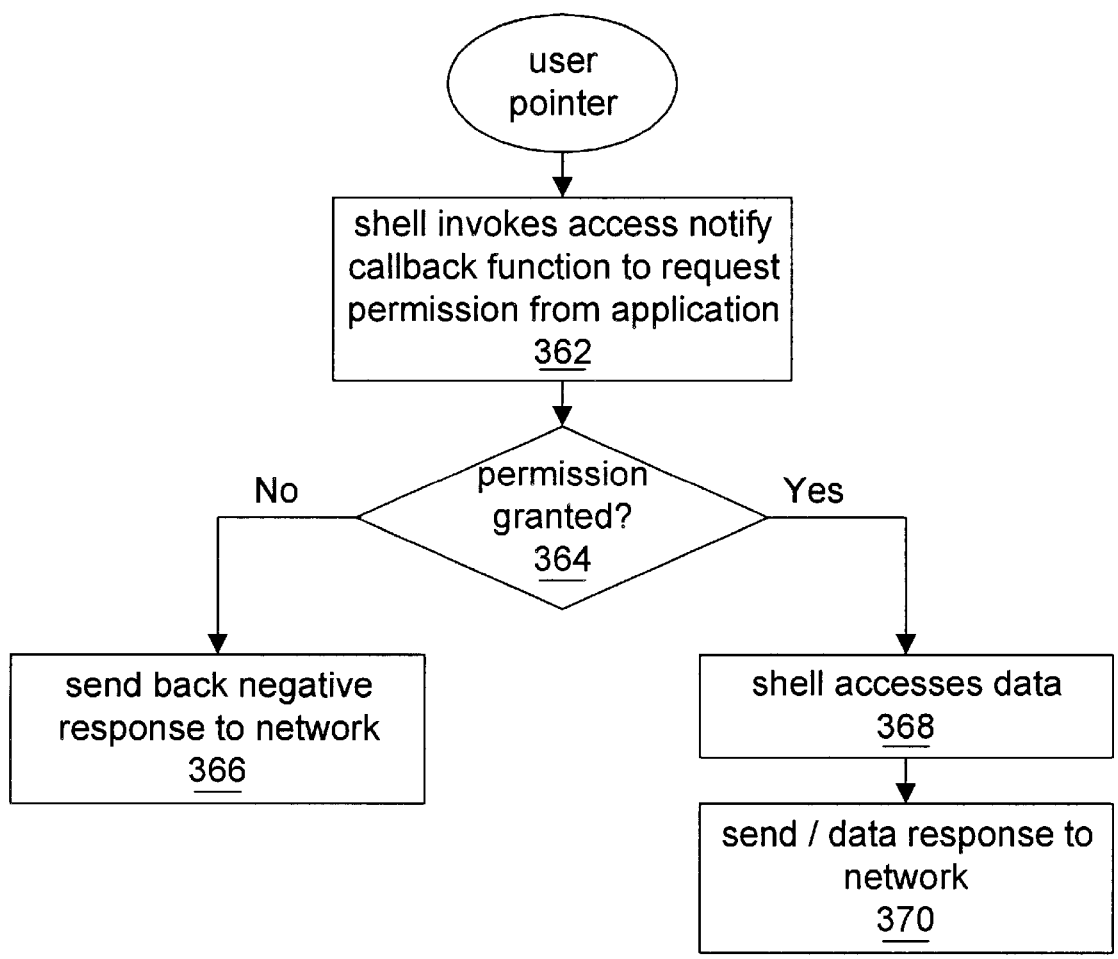

FIG. 3E—User Pointer

Referring now to FIG. 3E, if the data is determined in step 306 to be "user pointer", then in step 362 the shell invokes an access notify callback function to obtain permission from the user application to access the data or shell notify parameters.

In the case of a read, the shell executes or invokes the read callback function (CB_NOTIFY READ) to obtain permission from the user application to read from the shell notify parameters or data. In the case of a write, the shell executes or invokes the write notify callback function (CB_NOTIFY_WRITE) to obtain permission from the user application to write to the shell notify parameters or data. The function block shell invokes the read or write notify callback function when responding to a remote write request of a parameter with ownership type SHELL NOTIFY or USER_PTR. The function block shell invokes this function to obtain the user application's permission to read or modify the data.

In step 364 the function block shell determines if permission is granted. The user application returns a success value R_SUCCESS if the request is allowed, and an error code otherwise. If permission is not granted, then in step 366 the function block shell provides a negative response to the network. If permission is granted by the user application in response to the access notify callback function, then in step 368 the function block shell accesses the data and in step 370 the shell returns a data/response back to the network. The access performed in step 368 involves the function block shell acquiring a semaphore, performing the access, and then releasing the semaphore.

Thus, as noted above, in USER_PTR ownership, the user application owns the data. The user application informs the function block shell of the pointer to the parameter in the function block registration process. The function block shell has direct access to the data. In the user pointer ownership scheme, semaphores are created to ensure mutual exclusion for accessing parameter data. One semaphore is created for each function block, including the resource block and the transducer block. In preferred embodiment, before the function block shell can access a parameter with USER_PTR ownership, the function block shell is required to acquire the semaphore of the block to which the parameter belongs. After acquiring the semaphore, the function block shell can then access the data. After the function block shell accesses the parameter, the function block shell releases the semaphore. As noted above, USER_PTR ownership is not allowed in a non-embedded application.

In the user pointer ownership scheme, semaphores are created to ensure mutual exclusion for accessing parameter data. One semaphore is created for each function block, including the resource block and the transducer block. Acquisition of the semaphore is necessary before accessing to ensure that only one application, i.e., either the user application or the shell, is accessing the parameter data at any one time.

In the user application program, before the user application can access a parameter with USER_PTR ownership, the user application uses shWaitBlockSem to acquire the semaphore of the block to which the parameter belongs. Acquisition of the semaphore is necessary before accessing the data. After the user application accesses the parameter, the user application uses shSignalBlockSem to release the semaphore. USER_PTR ownership is not allowed in a non-embedded application.

Figure 4:
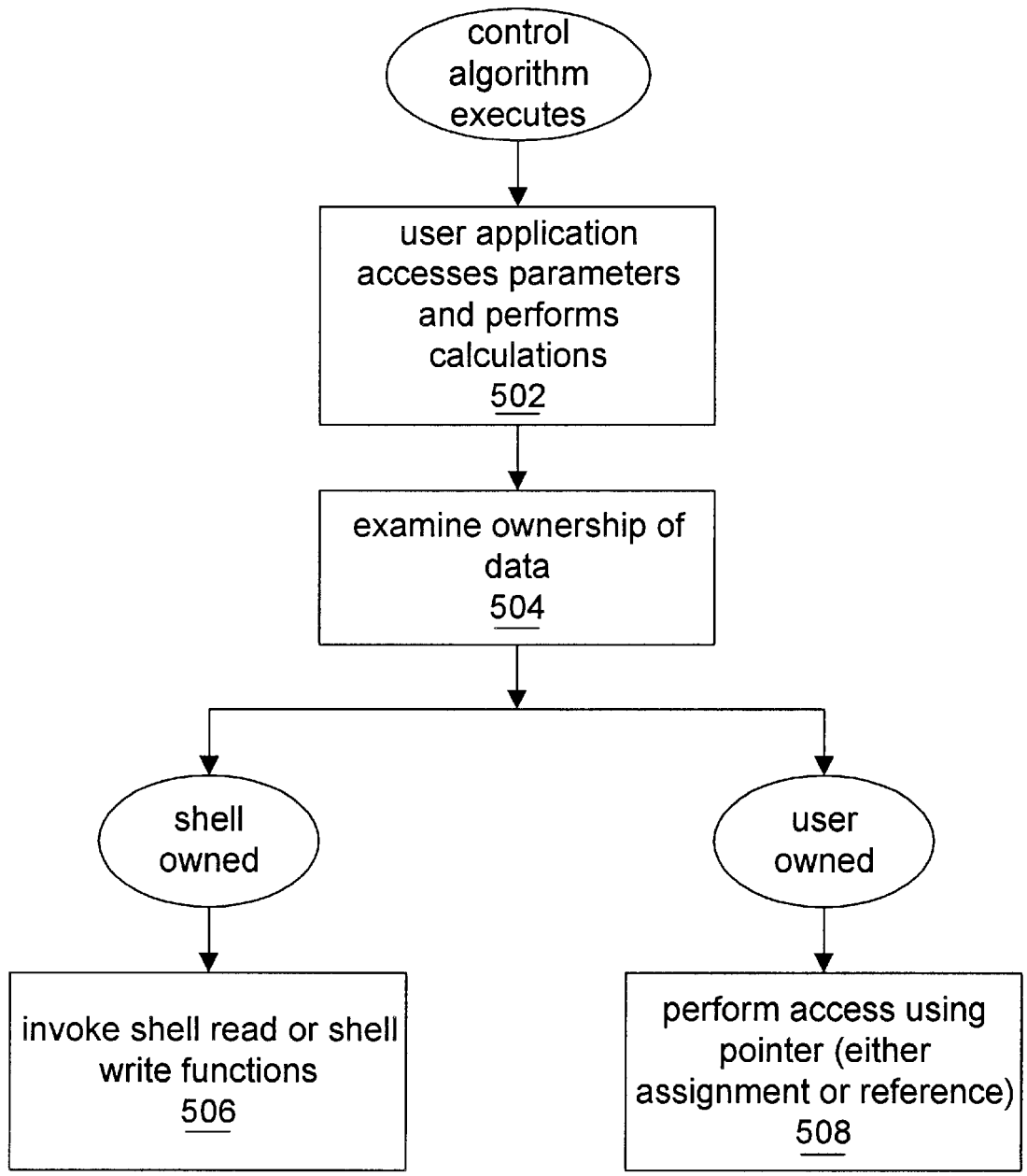
FIG. 4 is a flowchart diagram illustrating operation of a function block application when a parameter access or data access occurs.

FIG. 4—User Application Access

Referring now to FIG. 4, a flowchart diagram illustrating operation when a user application executes is shown. In the preferred embodiment, the user application is a function block application or other block application. For example, the user application may be a control algorithm comprised in a function block application. FIG. 4 illustrates operation when an access to one or more parameters or data in a block, such as a function block, is shown. FIG. 4 illustrates a data access operation, such as either a read or write operation.

As shown, in step 502, the user application accesses parameters and performs calculations. In performing an access of a parameter, in step 504 the user application examines ownership of the data. It is noted that the ownership may either be shell owned or user owned. If the data is shell owned, then in step 506 the method invokes the shell read or shell write function in order to direct the function block shell to perform the read or write opoeration. If the data is determined to user owned, then in step 508 the user application performs the access using a pointer. Access is performed using either an assignment or a reference for a read or write, respectively.

Thus, when the user application, such as a function block application, performs accesses to parameters, the user application examines ownership of the data. If the data is shell owned, then user application is required to invoke a function to direct the shell to perform the read or write operation. If the data is user owned, then the user application performs the access using a pointer to the data.

What is claimed is:

1. A method for accessing data on a fieldbus device in a fieldbus network, wherein the fieldbus device includes a user application executing on the fieldbus device, wherein the user application comprises a function block application executing on the fieldbus device, wherein the fieldbus device stores a plurality of block parameters, wherein the fieldbus device further includes a shell executing on the fieldbus device, the method comprising:

the user application registering an ownership attribute with each of the block parameters with the shell;

receiving a request to access data on a fieldbus device after said registering;

determining an ownership attribute of the data, wherein possible ownership attributes include user owned or shell owned;

the shell accessing the data in response to determining that the ownership attribute of the data is shell owned; and the user application accessing the data in response to determining that the ownership attribute of the data is user owned.

2. The method of claim 1, wherein said possible ownership attributes include user pointer ownership, the method further comprising:

the user application providing a pointer to the data to the shell prior to receiving the request;

creating a semaphore which controls accessing of the data, wherein the semaphore ensures mutual exclusion for accessing the data by the user application and the shell, wherein the creating the semaphore is performed prior to the shell receiving the network request.

3. The method of claim 2, wherein the ownership attribute of the data is user pointer ownership, the method further comprising:

acquiring the semaphore for the data in response to determining that the ownership attribute of the data is user pointer ownership;

accessing the data after said acquiring the semaphore for the data; and releasing the semaphore after said accessing the data.

4. The method of claim 3, wherein the user application provides the request to access the data on the fieldbus device, the method further comprising:

the user application invoking an access semaphore function on the shell to acquire the semaphore for the data in response to determining that the ownership attribute of the data is user pointer; and the user application invoking a release semaphore function on the shell to release the semaphore for the data after said accessing the data.

5. The method of claim 2, wherein the request to access data is a network request from a remote device, the method further comprising:

the shell executing an access function to request permission from the user application to perform the access;

the shell performing the access if the user application grants permission.

6. The method of claim 5, wherein the shell performing the access further comprises:

the shell acquiring the semaphore for the data;

accessing the data after said acquiring the semaphore for the data; and releasing the semaphore after said accessing the data.

7. The method of claim 1, wherein said possible ownership attributes include user alone ownership, and wherein the request to access data is provided by the user application, the method further comprising:

the user application accessing the data in response to determining that the ownership attribute of the data is user alone ownership;

wherein the shell does not have direct access to the data when the ownership attribute of the data is user alone ownership.

8. The method of claim 1, wherein the ownership attribute of the data is user owned, and wherein the request to access data is a network request from a remote device;

wherein the receiving the request to access data on the fieldbus device comprises the shell receiving the request to access data on the fieldbus device;

the method further comprising:

the shell executing an access function to access the data in response to determining that the ownership attribute of the data is user owned; and the user application accessing the data in response to the shell executing the access function to access the data.

9. The method of claim 1, wherein the ownership attribute of the data is user owned, and wherein the request to access data is a network request from a remote device;

wherein the receiving the request to access data on the fieldbus device comprises the shell receiving the request to access data on the fieldbus device;

the method further comprising:

the shell executing an access function to access the data in response to determining that the ownership attribute of the data is user owned;

the user application providing a pointer to the data to the shell in response to the shell executing the access function; and the shell accessing the data in response to the user application providing the pointer to the data to the shell.

10. The method of claim 1, wherein the ownership attribute of the data is user owned, and wherein the request to access data is a network request from a remote device;

wherein the receiving the request to access data on the fieldbus device comprises the shell receiving the request to access data on the fieldbus device;

the method further comprising:

the shell executing an access function to access the data in response to determining that the ownership attribute of the data is user owned;

the user application determining if the access of data is permitted in response to the shell executing the access function; and the user application returning an error code if the access of data is not permitted.

11. The method of claim 1, wherein said possible ownership attributes include shell notify ownership, and wherein the request to access data is a network request from a remote device;

the shell executing an access notify function to request permission of the user application to access the data in response to determining that the ownership attribute of the data is shell notify ownership;

the user application determining if the access of data is permitted in response to the shell executing the access notify function; and the shell accessing the data if the user application determines that the access of data is permitted.

12. The method of claim 1, wherein the shell is a fieldbus function block shell.

13. A method for accessing data on a fieldbus device in a fieldbus network, wherein the fieldbus device includes a user application executing on the fieldbus device, wherein the fieldbus device further includes a shell executing on the fieldbus device, the method comprising:

the shell receiving a network request to access data on a fieldbus device;

determining an ownership attribute of the data, wherein possible ownership attributes include user owned or shell owned;

the shell accessing the data in response to determining that the ownership attribute of the data is shell owned;

wherein, if the ownership attribute of the data is user owned, the method comprises:

the shell invoking an access function to the user application in response to determining that the ownership attribute of the data is user owned;

the user application providing a pointer to the data to the shell in response to the shell invoking the access function; and the shell accessing the data in response to the user application providing the pointer to the data to the shell.

14. The method of claim 13, wherein the ownership attribute of the data is user owned, the method further comprising:

determining if the access of data is permitted in response to the shell invoking the access function;

the user application returning an error code if the access of data is not permitted.

15. The method of claim 13, wherein the ownership attribute of the data is user owned, the method further comprising:

the user application accessing the data in response to the shell invoking the access function in the user application;

wherein the shell receiving the network request to access data on the fieldbus device comprises the shell receiving a network request to write data to the fieldbus device;

wherein the user application accessing the data in response to the shell invoking the access function in the user application comprises the user application processing the data.

16. The method of claim 13, wherein the ownership attribute of the data is user owned, the method further comprising:

the user application accessing the data in response to the shell invoking the access function in the user application;

wherein the shell receiving the network request to access data on the fieldbus device comprises the shell receiving a network request to read data from the fieldbus device;

wherein the user application accessing the data in response to the shell invoking the access function in the user application comprises the user application storing the data in a buffer.

17. The method of claim 13, wherein said possible ownership attributes include user pointer ownership, wherein said user pointer ownership allows said user application and said shell to access the data, the method further comprising:

the user application providing a pointer to the data to the shell prior to the shell receiving the network request;

creating a semaphore which ensures mutual exclusion for accessing the data prior to the shell receiving the network request; and wherein said semaphore is used during accesses to the data to ensure mutual exclusion for accessing the data.

18. The method of claim 13, wherein said possible ownership attributes include user pointer ownership, wherein said user pointer ownership allows said user application and said shell to access the data;

wherein the shell invoking an access function comprises the shell invoking an access notify function to request permission of the user application to access the data, wherein the shell invoking the access notify function is performed in response to determining that the ownership attribute of the data is user pointer ownership;

the user application determining if the access of data is permitted in response to the shell executing the access notify function; and the shell accessing the data if the user application determines that the access of data is permitted.

19. A method for accessing data on a fieldbus device in a fieldbus network, wherein the fieldbus device includes a user application executing on the fieldbus device, wherein the fieldbus device further includes a shell executing on the fieldbus device, the method comprising:

the user application providing a pointer to the data to the shell;

creating a semaphore which controls accessing of the data, wherein the semaphore ensures mutual exclusion for accessing the data by the user application and the shell;

receiving a request to access data on a fieldbus device after said providing and after said creating the semaphore;

determining an ownership attribute of the data, wherein possible ownership attributes include user owned, shell owned or user pointer ownership;

the shell accessing the data in response to determining that the ownership attribute of the data is shell owned; and the user application accessing the data in response to determining that the ownership attribute of the data is user owned.

20. The method of claim 19, wherein the ownership attribute of the data is user pointer ownership, the method further comprising:

acquiring the semaphore for the data in response to determining that the ownership attribute of the data is user pointer ownership;

accessing the data after said acquiring the semaphore for the data; and releasing the semaphore after said accessing the data.

21. The method of claim 20, wherein the user application provides the request to access the data on the fieldbus device, the method further comprising:

the user application invoking an access semaphore function on the shell to acquire the semaphore for the data in response to determining that the ownership attribute of the data is user pointer; and the user application invoking a release semaphore function on the shell to release the semaphore for the data after said accessing the data.

22. The method of claim 19, wherein the request to access data is a network request from a remote device, the method further comprising:

the shell executing an access function to request permission from the user application to perform the access;

the shell performing the access if the user application grants permission.

23. The method of claim 22, wherein the shell performing the access further comprises:

the shell acquiring the semaphore for the data;

accessing the data after said acquiring the semaphore for the data; and releasing the semaphore after said accessing the data.

24. A method for accessing data on a fieldbus device in a fieldbus network, wherein the fieldbus device includes a user application executing on the fieldbus device, wherein the fieldbus device further includes a shell executing on the fieldbus device, the method comprising:

receiving a network request from a remote device to access data on a fieldbus device;

determining an ownership attribute of the data, wherein possible ownership attributes include user owned or shell owned, wherein the ownership attribute of the data is user owned;

the shell executing an access function to access the data in response to determining that the ownership attribute of the data is user owned;

the user application providing a pointer to the data to the shell in response to the shell executing the access function; and the shell accessing the data in response to the user application providing the pointer to the data to the shell.

25. A method for accessing data on a fieldbus device in a fieldbus network, wherein the fieldbus device includes a user application executing on the fieldbus device, wherein the fieldbus device further includes a shell executing on the fieldbus device, the method comprising:

the shell receiving a network request from a remote device to access data on a fieldbus device;

determining an ownership attribute of the data, wherein possible ownership attributes include user owned or shell owned; and the shell executing an access function to access the data in response to determining that the ownership attribute of the data is user owned;

the user application determining if the access of data is permitted in response to the shell executing the access function; and the user application returning an error code if the access of data is not permitted.

26. A method for accessing data on a fieldbus device in a fieldbus network, wherein the fieldbus device includes a user application executing on the fieldbus device, wherein the fieldbus device further includes a shell executing on the fieldbus device, the method comprising:

receiving a network request from a remote device to access data on a fieldbus device;

determining an ownership attribute of the data, wherein possible ownership attributes include user owned, shell owned, or shell notify ownership;

the shell executing an access notify function to request permission of the user application to access the data in response to determining that the ownership attribute of the data is shell notify ownership;

the user application determining if the access of data is permitted in response to the shell executing the access notify function; and the shell accessing the data if the user application determines that the access of data is permitted.

27. A method for accessing data on a fieldbus device in a fieldbus network, wherein the fieldbus device includes a user application executing on the fieldbus device, wherein the fieldbus device further includes a shell executing on the fieldbus device, the method comprising:

the user application providing a pointer to the data to the shell;

creating a semaphore which ensures mutual exclusion for accessing the data;

the shell receiving a network request to access data on a fieldbus device after said providing and after said creating;

determining an ownership attribute of the data, wherein possible ownership attributes include user owned, shell owned, or user pointer ownership, wherein said user pointer ownership allows said user application and said shell to access the data;

the shell accessing the data in response to determining that the ownership attribute of the data is shell owned;

the shell invoking an access function to the user application in response to determining that the ownership attribute of the data is user owned;

wherein, if the ownership attribute of the data user pointer ownership, said semaphore is used during accesses to the data to ensure mutual exclusion for accessing the data.

28. A method for accessing data on a fieldbus device in a fieldbus network, wherein the fieldbus device includes a user application executing on the fieldbus device, wherein the fieldbus device further includes a shell executing on the fieldbus device, the method comprising:

the shell receiving a network request to access data on a fieldbus device;

determining an ownership attribute of the data, wherein possible ownership attributes include user owned, shell owned, or user pointer ownership, wherein said user pointer ownership allows said user application and said shell to access the data;

the shell accessing the data in response to determining that the ownership attribute of the data is shell owned;

the shell invoking an access function to the user application in response to determining that the ownership attribute of the data is user owned;

wherein, if the ownership attribute of the data is user pointer ownership, the method comprises:

the shell invoking an access notify function to request permission of the user application to access the data, wherein the shell invoking the access notify function is performed in response to determining that the ownership attribute of the data is user pointer ownership;

the user application determining if the access of data is permitted in response to the shell executing the access notify function; and the shell accessing the data if the user application determines that the access of data is permitted.

* * * * *